（12）United States Patent
Morin

(10) Patent No.: US 8,803,706 B2
(45) Date of Patent: *Aug. 12, 2014

(54) METHOD AND SYSTEM FOR CONTROLLING THE TRAFFIC FLOW THROUGH AN RFID DIRECTIONAL PORTAL

(71) Applicant: AT&T Intellectual Property I, L.P., Atlanta, GA (US)

(72) Inventor: Raymond B. Morin, Wesley Chapel, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,514

(22) Filed: Jul. 12, 2013

(65) Prior Publication Data

US 2013/0300584 A1    Nov. 14, 2013

Related U.S. Application Data

(63) Continuation of application No. 12/126,485, filed on May 23, 2008, now Pat. No. 8,487,747.

(51) Int. Cl.
| | |
|---|---|
| G08G 1/095 | (2006.01) |
| H04Q 5/22 | (2006.01) |
| G08B 13/14 | (2006.01) |
| G08G 1/09 | (2006.01) |
| G08B 21/00 | (2006.01) |
| G08B 1/08 | (2006.01) |
| G05D 1/00 | (2006.01) |
| G05F 7/00 | (2006.01) |

(52) U.S. Cl.
USPC ...... 340/907; 340/10.1; 340/10.2; 340/572.1; 340/905; 340/540; 340/539.27; 701/1; 701/9

(58) Field of Classification Search
USPC .......... 340/582, 568, 825.35, 825.54, 825.31, 340/825.3, 572.1, 568.1, 568.5, 568.8, 5.1, 340/10.1, 825.25, 5.7, 10.2, 539.27, 10.3, 340/540; 701/117, 23, 24
See application file for complete search history.

(56) References Cited

U.S. PATENT DOCUMENTS

| | | | | |
|---|---|---|---|---|
| 5,886,634 | A * | 3/1999 | Muhme ...................... | 340/572.1 |
| 6,008,727 | A * | 12/1999 | Want et al. ................. | 340/572.1 |
| 6,163,277 | A * | 12/2000 | Gehlot ......................... | 340/905 |
| 6,300,872 | B1 * | 10/2001 | Mathias et al. .............. | 340/540 |
| 7,180,441 | B2 | 2/2007 | Rowe et al. | |
| 7,292,628 | B2 | 11/2007 | Koerner et al. | |
| 7,345,576 | B2 * | 3/2008 | Allen et al. .................. | 340/10.2 |
| 7,360,095 | B2 | 4/2008 | Girouard et al. | |

(Continued)

Primary Examiner — Jennifer Mehmood
Assistant Examiner — Mirza Alam

(57) ABSTRACT

A system having a first motion sensor configured to sense movement of an object on a first side of a portal, the object including an RFID tag, a first RFID reader being activated by the first motion sensor when the first motion sensor senses movement of the object, the first RFID reader reading the RFID tag, a second motion sensor configured to sense movement of the object on a second side of the portal and a second RFID reader being activated by the second motion sensor when the second motion sensor senses movement of the object, the second RFID reader reading the RFID tag, wherein, when one of the first and second motion sensors sense movement of the object, the other one of the first and second motion sensors is deactivated for a predetermined period of time.

20 Claims, 7 Drawing Sheets

(56) References Cited

U.S. PATENT DOCUMENTS

| | | | |
|---|---|---|---|
| 2006/0155427 A1* | 7/2006 | Yang | 701/1 |
| 2006/0197652 A1* | 9/2006 | Hild et al. | 340/10.2 |
| 2007/0139216 A1* | 6/2007 | Breed | 340/825.72 |
| 2008/0036590 A1* | 2/2008 | Gonzales et al. | 340/539.27 |
| 2008/0159088 A1* | 7/2008 | Simmons et al. | 369/44.14 |
| 2008/0284600 A1* | 11/2008 | Drzaic et al. | 340/572.1 |

\* cited by examiner

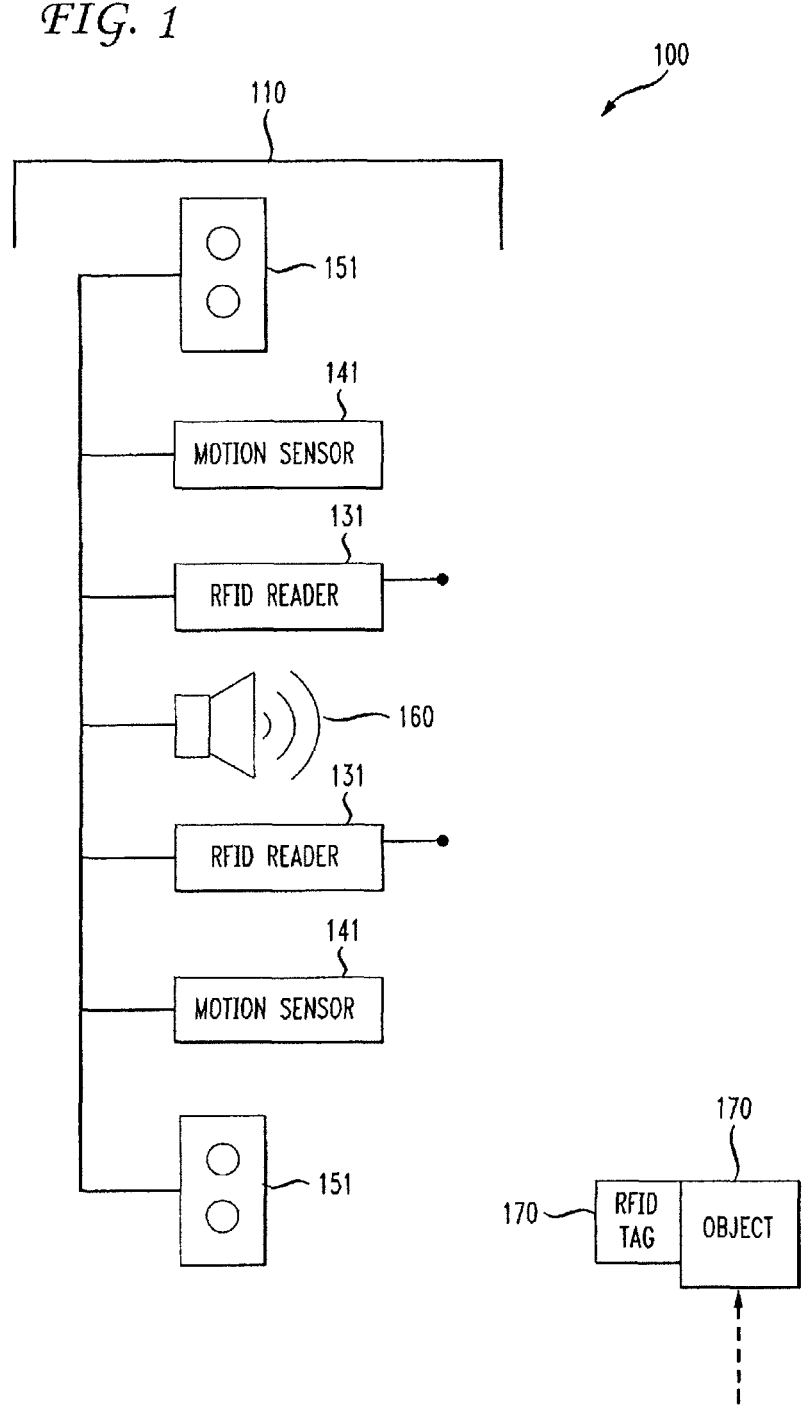

| CONDITION | A | | B | |
|---|---|---|---|---|
| | RELAY | LED | RELAY | LED |
| ACTIVATION | 4o⟋5 9⟋8 3o 7⟋6 | ☼ | 4o⟋5 9⟋8 3o 7⟋6 | ☼ |
| NO ACTIVATION | 4o⟋5 9⟋8 3o 7⟋6 | ● | 4o⟋5 9⟋8 3o 7⟋6 | ● |
| POWER LOSS | 4o⟋5 9⟋8 3o 7⟋6 | ● | 4o⟋5 9⟋8 3o 7⟋6 | ● |

US 8,803,706 B2

METHOD AND SYSTEM FOR CONTROLLING THE TRAFFIC FLOW THROUGH AN RFID DIRECTIONAL PORTAL

BACKGROUND

This application is a continuation of U.S. patent application Ser. No. 12/126,485, filed May 23, 2008, now U.S. Pat. No. 8,487,747, and is herein incorporated in its entirety.

Radio frequency identification ("RFID") is a term for technologies that use radio waves to identify objects. Specifically, RFID technologies perform automatic identification of objects through storing and remotely retrieving data using RFID tags. Typically, a unique identifier that identifies these objects, as well as additional information, is stored on a microchip that is attached to an antenna within the RFID tag. The antenna enables the chip to transmit the identification information to an RFID reader. Accordingly, the RFID reader converts the radio waves reflected back from the RFID tag into digital information that computers can receive and process on behalf of user applications.

A common problem for a tracking system utilizing RFID technologies is to determine the direction in which an RFID tag approaches and passes by the RFID reader. For example, it may be difficult to determine whether a retail item is entering or exiting a storefront, or whether a vehicle is return to or leaving a location. RFID portals may be placed at the entry points of such locations, wherein a group of RFID readers may track the RFID tags. However, conventional RFID portals simply monitor the time in which one of the RFID readers senses the RFID tag. Specifically, if a first RFID reader senses the RFID tag at time (x) and a second RFID reader sense the same tag at time (x+1), it is assumed that the tag is moving from the first RFID reader towards the second RFID reader. However, this conventional system relies on the accuracy and the strength of signal of the RFID readers. Such a system may be greatly compromised in a confined area.

SUMMARY OF THE INVENTION

A system having a first motion sensor configured to sense movement of an object on a first side of a portal, the object including an RFID tag, a first RFID reader being activated by the first motion sensor when the first motion sensor senses movement of the object, the first RFID reader reading the RFID tag, a second motion sensor configured to sense movement of the object on a second side of the portal and a second RFID reader being activated by the second motion sensor when the second motion sensor senses movement of the object, the second RFID reader reading the RFID tag, wherein, when one of the first and second motion sensors sense movement of the object, the other one of the first and second motion sensors is deactivated for a predetermined period of time.

A method for sensing, by a first motion sensor arranged at a first side of a portal, a movement of an object, the object including an RFID tag, activating, upon sensing the movement, a first RFID reader and deactivating, upon sensing the movement, a second motion sensor arranged at a second side of the portal.

BRIEF DESCRIPTION OF THE DRAWINGS

FIG. 1 shows an exemplary system for controlling the traffic flow through an RFID directional portal according to the exemplary embodiments of the present invention.

DETAILED DESCRIPTION

Figure 2A:
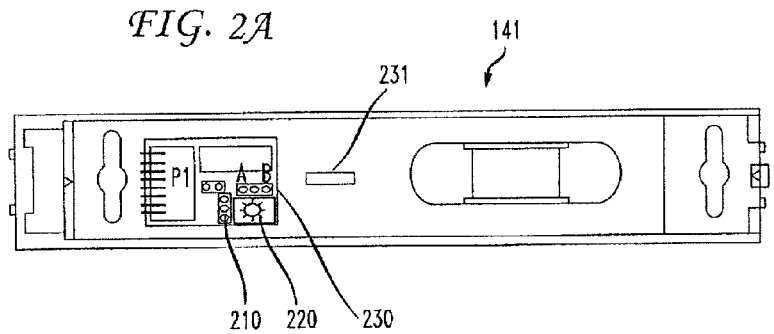
FIG. 2A shows an exemplary embodiment of a sensor according to the exemplary embodiments of the present invention.

The present invention may be further understood with reference to the following description of exemplary embodiments and the related appended drawings, wherein like elements are provided with the same reference numerals. The present invention is related to systems and methods used to implement a directional radio frequency identification ("RFID") portal. Specifically, the present invention is related to systems and methods for using multiple dual relay motion sensors cascaded together in order to provide input controlling RFID antennas of the RFID portal. Furthermore, the motion sensors may provide users of the RFID portal with audio and visual cues, such as a buzzer and light stacks (e.g., signaling device, "traffic light," etc.), to facilitate the flow through the directional portal.

As opposed to depending on the time-based detection of the abovementioned conventional RFID portals, the RFID port according to the exemplary embodiments of the present invention may be wired in a manner so that when a first motion sensor is activated, an opposing second motion sensor may be deactivated. Accordingly, the output of the motion sensors may be used to activate one or more RFID readers and/or general-purpose input/output ("GPIO") ports of the exemplary RFID portal. In other words, the directionality of an RFID tag moving through the RFID portal may be determined simply by the fact that a specific antenna of an RFID reader read the RFID tag, rather than determining directionality by a timestamp. Furthermore, since a time-based solution for directionality is no longer required, the power of the antennas within the RFID readers of the portal may be increased in order to improve the rates in which the RFID tags are read.

FIG. 1 shows an exemplary system 100 for controlling the traffic flow through an RFID directional portal 110 according to the exemplary embodiments of the present invention. The exemplary RFID portal 110 may include one or more RFID readers 131, 132, as well as at least two motion sensors 141, 142 at opposing ends of the portal 110. In addition, the RFID portal 110 may include at least two visual indicators (e.g., stack lights 151, 152, or "traffic light") also at opposing ends of the RFID portal 110. For audio cues, the RFID portal 110 may also include an audio indicator (e.g., an audible buzzer 160) to inform a user whether traffic is permitted or not permitted through the RFID portal 110. Furthermore, the exemplary system 100 may also include an object 170, wherein the object 170 may include an RFID tag 171. Accordingly, the RFID tag 171 may be detectable and readable to the one or more RFID readers 131, 132 of the RFID portal 110.

The RFID readers 131, 132 according to the exemplary embodiments of the present invention may also be used to describe RFID readers including antennas and transceivers for communicating with the RFID tag 171 in accordance with the principles and functionality described herein. As will be described in greater detail below, the functionalities of the RFID readers 131, 132, may be driven by any activity detected via one of the motion sensors 141, 142, and/or an additional relay module.

The exemplary motion sensors 141, 142, or motion detectors, may utilize a variety of methods for the electronic identification of the object 170, such as optical detection and/or acoustical detection. For example, infrared light or laser technology may be used for optical detection. In addition, the motion sensors may employ digital cameras connected to a computer network for storing and managing captured images to be viewed later or viewed over the computer network. For example, the computer network may detect motion through the comparison of a current image from a fixed camera with a reference image and count the number of different pixels.

The exemplary visual indicators may be the stack lights 151, 152 that may provide users with a visual cue as to whether traffic may be permitted to proceed through the RFID portal 110. Accordingly, the stacks lights 151, 152 may include a stop signal (e.g., a red light) and an advance signal (e.g., a green light). The stop signal may direct a user to wait for opposing traffic traveling through the RFID portal 110 prior to permitting the user, and/or the object 170, to pass through the RFID portal 110. Once the RFID portal 110 is clear of traffic, the advance signal may direct that the user, and/or the object 170, is permitted to travel through the RFID portal 110. As will be described in greater detail below, the functionality of the stack lights 151, 152 may be driven by activity detected via one of the motion sensors 141, 142, and/or an additional relay module.

According to the exemplary embodiments of the present invention, the system 100 allows the RFID portal 110 to maintain the rate in which RFID tags are read. When the RFID portal 110 is implemented in a very confined area, it may be necessary to reduce the power of the signal emitted from the RFID antennas. While this reduction of the signal power may adversely affect the read rate for conventional timestamp-based RFID portals, the directional RFID port 110 according to the exemplary embodiments may not experience any reduction of read rates. Specifically, the directionality of the object 170 moving through the exemplary RFID portal 110 may be determined simply by the fact that a specific one of the RFID readers 131, 132 detected and read the RFID tag 171. Since a timestamp-based solution is not used in the exemplary system 100, the signal power of the antennas within the RFID readers 131, 132 may be increased within the RFID portal 110, thereby improving the read rates at the RFID portal 110.

FIG. 2A shows an exemplary embodiment of one of the motion sensors 141 according to the exemplary embodiments of the present invention. The exemplary motion sensor 141 will be described with reference to the exemplary system 100 of FIG. 1. As described above, the motion sensor 141 may include circuitry for activating and deactivating the RFID readers 131, 132, the stack lights 151, 152, as well as a further motion sensor (e.g., the opposing motion sensor 142). According to one embodiment, the motion sensor 141 may be a wall or ceiling-mounted passive infrared detector. Furthermore, the motion sensor 141 may project an infrared light pattern in order to effectively monitor traffic passing through the RFID portal 110.

The motion sensor 141 may include a resettable/non-resettable jumper 210 for selecting a mode of operation for a latch timer 211 within the motion sensor 141. The mode of operation may include a resettable and a non-resettable timer mode. Specifically, the jumper selection of the timer mode may determine whether the relay resets at the end of a latch time or, alternatively, if further detected motion will extend the latch time. In the resettable timer mode, the latch timer 211 may continuously reset once activated (e.g., at the first detection of motion) as long as motion is detected. In other words, any further detected motion may restart the latch timer 211 so that the relay may only deactivate when the motion sensor 141 no longer detects motion and the latch time has expired. In a non-resettable time mode, the latch timer 211 may not reset once activated until the latch time has expired. In other words, the relay may activate once the motion sensor 141 first detects motion and the relay may deactivate at the expiration of the latch time even if motion is present within the RFID portal 110. As a default, the resettable/non-resettable jumper 210 may be set to the resettable timer mode.

The motion sensor 141 may include a latch time adjust potentiometer 220 for adjusting the relay latch time based on desired usage and/or specific needs of the RFID portal 110. The latch time may indicate the amount of time in which the relay may remain active after movement of the object 170 is detected by the motion sensor 141. Accordingly, the latch time may be adjusted in order to set a predetermined time frame for the active signal time resolution of the motion sensor 141. For example, the latch time may be set from 3 to 60 seconds.

The motion sensor 141 may include a relay mode jumper 230 for selecting a fail safe mode or a fail secure mode in the event of a power loss. As a default, the fail safe mode may be selected. Accordingly, based on the mode selected by the relay mode jumper 230, the configurations of the relay may be adjusted in response to certain conditions such as "activation", "no activation", and "power loss." In addition, it should be noted that while the motion sensor 141 is in an activated condition, a light emitting diode ("LED") 231 may be illuminated.

Figure 2B:
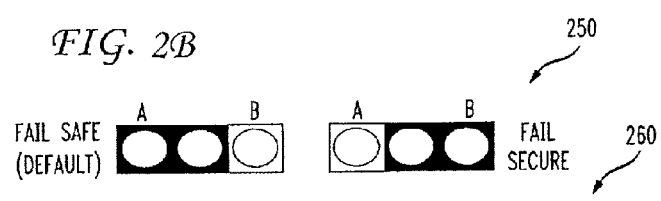
FIG. 2B shows an exemplary relay mode jumper setting and an exemplary response chart for the path configurations and the LED according to the exemplary embodiments of the present invention.

FIG. 2B shows a relay mode jumper setting 250 and a response chart 260 for the path configurations and the LED 231 according to the exemplary embodiments of the present invention. While the relay mode jumper 230 is in the fail safe mode, the placement of the motion sensor 141 in an activated condition may illuminate the LED 231 and close paths 3→4 and 6→7, leaving paths 3→5 and 6→8 open. The deactivation of the motion sensor 141 may deactivate the LED 231 and reverse each of these paths, respectively. Alternatively, while the relay mode jumper 230 is in the fail secure mode, the placement of the motion sensor 141 in an activated condition may illuminate the LED 231 and close paths 3→5 and 6→8, leaving paths 3→4 and 6→7 open. Likewise, the deactivation of the motion sensor 141 may deactivate the LED 231 and reverse each of these paths, respectively. It should be noted that in the fail safe mode, a "power loss" condition of the motion sensor 141 may maintain the same path configuration as the "activation" condition. However, in the fail secure mode, a "power loss" condition of the motion sensor 141 may maintain the same path configuration as the "no activation" condition.

FIGS. 3A-3D shows the path configurations for two of the motion sensors (e.g., left motion sensor 141 and right motion sensor 142) of the RFID portal 110 in a variety of active and inactive states according to the exemplary embodiments of the present invention. FIG. 3A-3D will be described with reference to the exemplary system 100 of FIG. 1. It should be noted that both motion sensors 141, 142 may not be simultaneously activated. As described above, the activation of one of the motion sensors (e.g., the left motion sensor 141) may deactivate a further motion sensor (e.g., the motion right sensor 142). According to the exemplary embodiments, the motion sensors 141, 142 may be in communication with a relay module (e.g., an external relay power fail operator 310), and both of the light stacks (e.g., left light stack 151 and right light stack 152), as well as being in communication with each other.

The left motion sensor 141 may include an inactive setting of closed paths 3→5 and 6→8, as well as an active setting of closed paths 3→4 and 6→7. The right motion sensor 142 may include an inactive setting of closed paths 3→4 and 6→7, as well as an active setting of closed paths 3→5 and 6→8. In addition, each of the light stacks 151, 152 may include two light configurations, such as an activated red light and an activated green light. Specifically, the left light stack 151 may include a left red ("LR") light and a left green ("LG") light, while the right light stack 152 may include a right red ("RR") light and a right green ("RR") light. As described above, an activated LR light may indicate that no traffic may travel into the RFID portal 110 via the left side (e.g., the side of the left motion sensor 141) and an activated LG light may indicate that traffic may travel in from the left side. Accordingly, the RR and RG lights may perform the same function on the right side of the RFID portal 110. Finally, the external relay power fail operator 310 may include two settings, namely closed paths 5→3 and closed path 5→1.

Figure 3A:
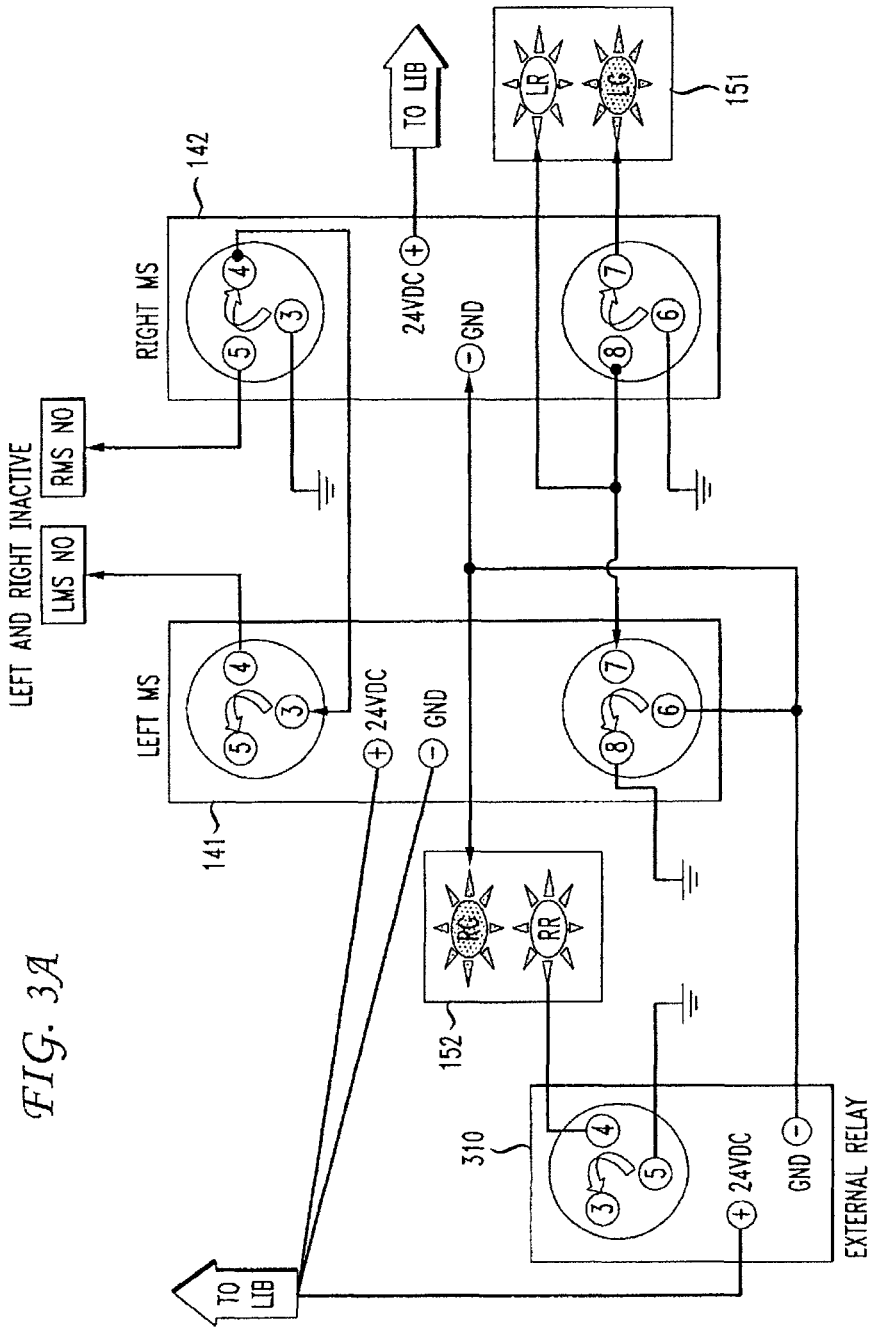
FIGS. 3A-3D show the path configurations for two of the motion sensors of the RFID portal in a variety of activate and inactive states according to the exemplary embodiments of the present invention.

In FIG. 3A, both of the motion sensors 141, 142 may be inactive. Specifically, neither of the motion sensors 141, 142 have detected movement on either side of the RFID portal 110. Accordingly, both the LG and the RG light may be illuminated, indicating to the user that traffic is permitted from either side.

Figure 3B:
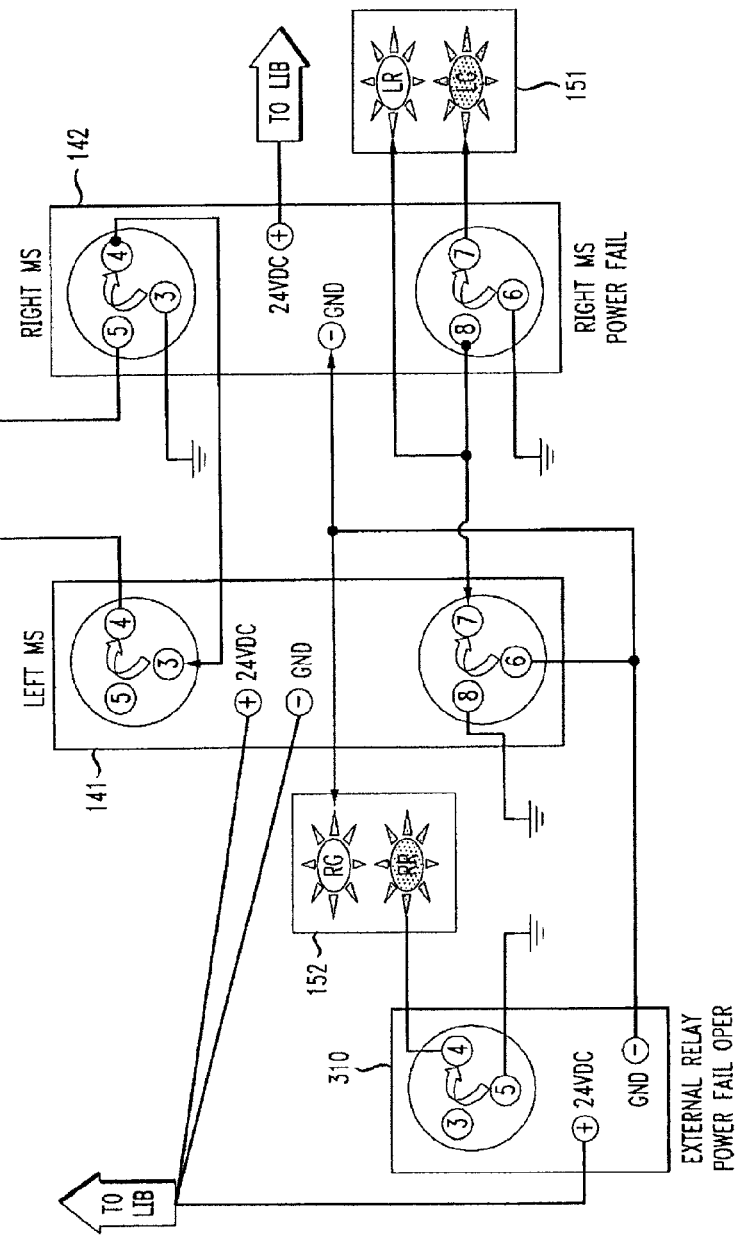

In FIG. 3B, the left motion sensor 141 may be activated while the right motion sensor 142 is inactive. For instance, the left motion sensor 141 may have detected movement on the left side of the RFID portal 110, thereby placing the motion sensor 141 into an activated state. Accordingly, the path configuration of the motion sensor 141 may be switched to an activated configuration. Specifically, the closed paths 3→5 and 6→8 may be opened while paths 3→4 and 6→7 may be closed. As illustrated in FIG. 3B, the activation of the left motion sensor 141 places the right motion sensor 142 in a power fail state. Since the right motion sensor 142 was already inactive, there is no change in the path configurations of the right motion sensor 142. However, the activation of the left motion sensor 141 switches the path configuration of the external relay power fail operator 310 from the closed 5→3 path to the closed 5→1 path. Accordingly, this switch will activate the RR light on light stack 152 to indicate that no traffic is permitted from the right side of the RFID portal 110. The LG light on light stack 151 may remain lit as the detected activity originated on the left side of the RFID portal 110, and thus, traffic may be permitted from this side.

Figure 3C:
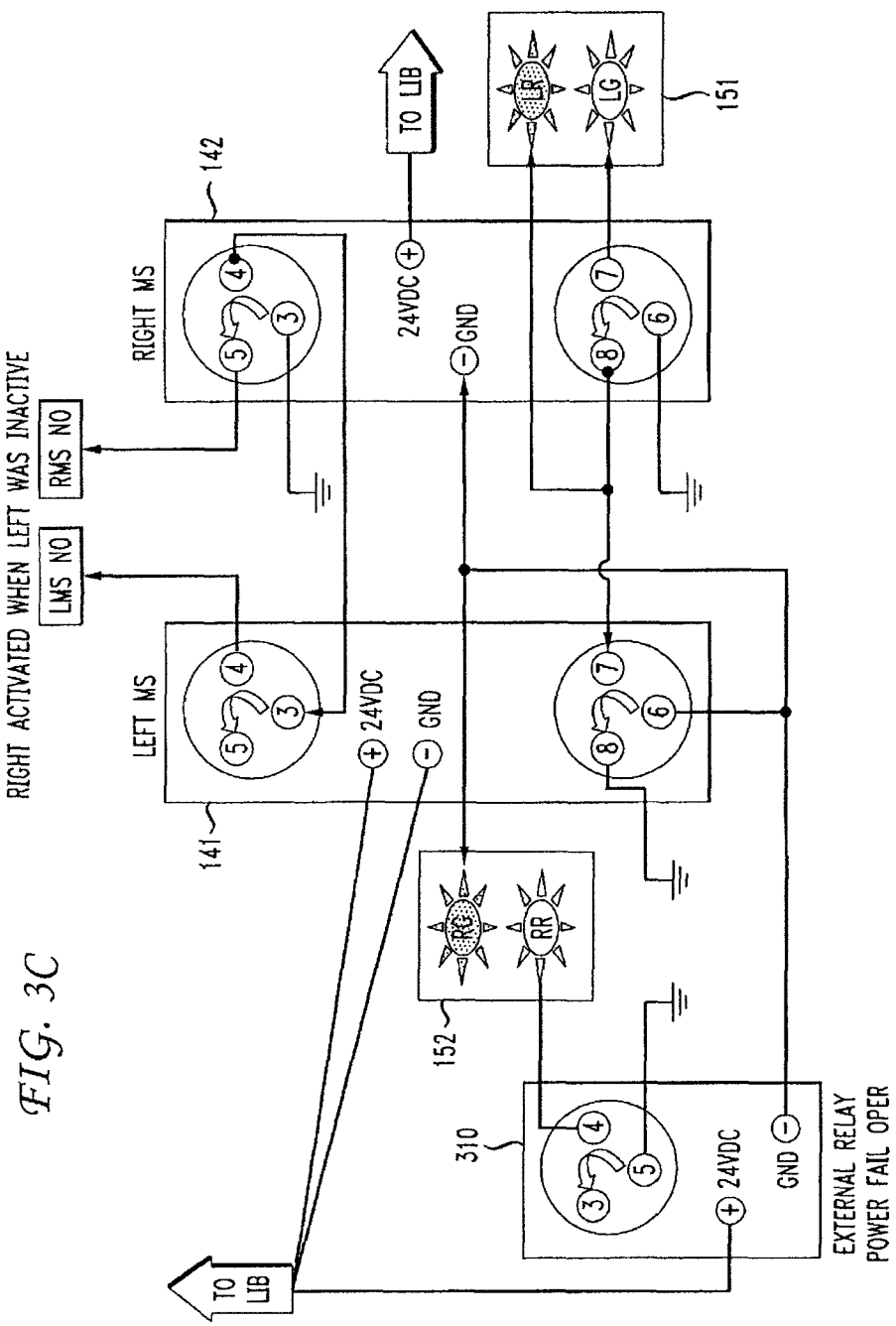

In FIG. 3C, the right motion sensor 142 may be activated while the left motion sensor 141 is inactive. For instance, the right motion sensor 142 may have detected movement on the right side of the RFID portal 110, thereby placing the motion sensor 142 into an activated state. It should be noted that the main ground path of the right motion sensor 142 travels through the closed 6→8 path of the left motion sensor 141. Accordingly, if the left motion sensor 141 goes active at this point, the right motion sensor 142 may save itself by driving its own ground via the newly closed 6→7 path of the left motion sensor 141 back to the closed 8→6 path on the right motion sensor 142. It should be noted that the RG light of the light stack 152 has now been activated to indicate that traffic may travel from the right side. In addition, the closure of the 6→8 path on the right motion sensor 142 may now activate the LR light on the light stack 151 to indicate that traffic is not permitted from the left side.

Figure 3D:
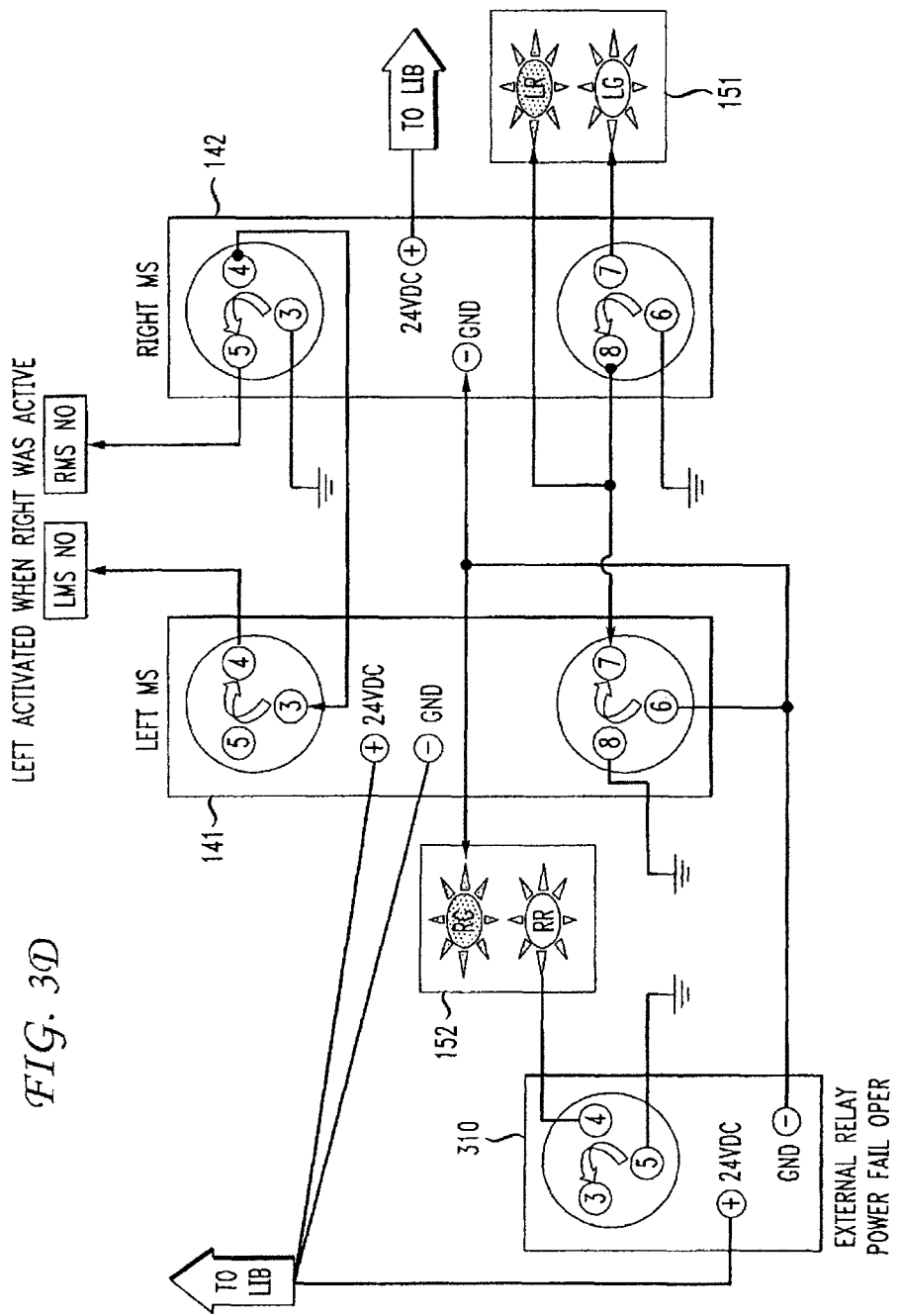

In FIG. 3D, the left motion sensor 141 may be activated while the right motion sensor 142 is active. As described above, the right motion sensor 142 may now drive its own ground. Furthermore, the activation of the left motion sensor 141 may switch the closed 3→5 path of the sensor 141 to a closed 3→4 path. However, the driver for the 3→4 path of the left motion sensor 141 is pin 4 of the right motion sensor 142. As illustrated in FIGS. 3C and 3D, when the right motion sensor 142 is activated, the 3→4 path is open. Accordingly, the left motion sensor 141 is unable to transmit the "LMS NO" signal through the system 100.

Figure 4:
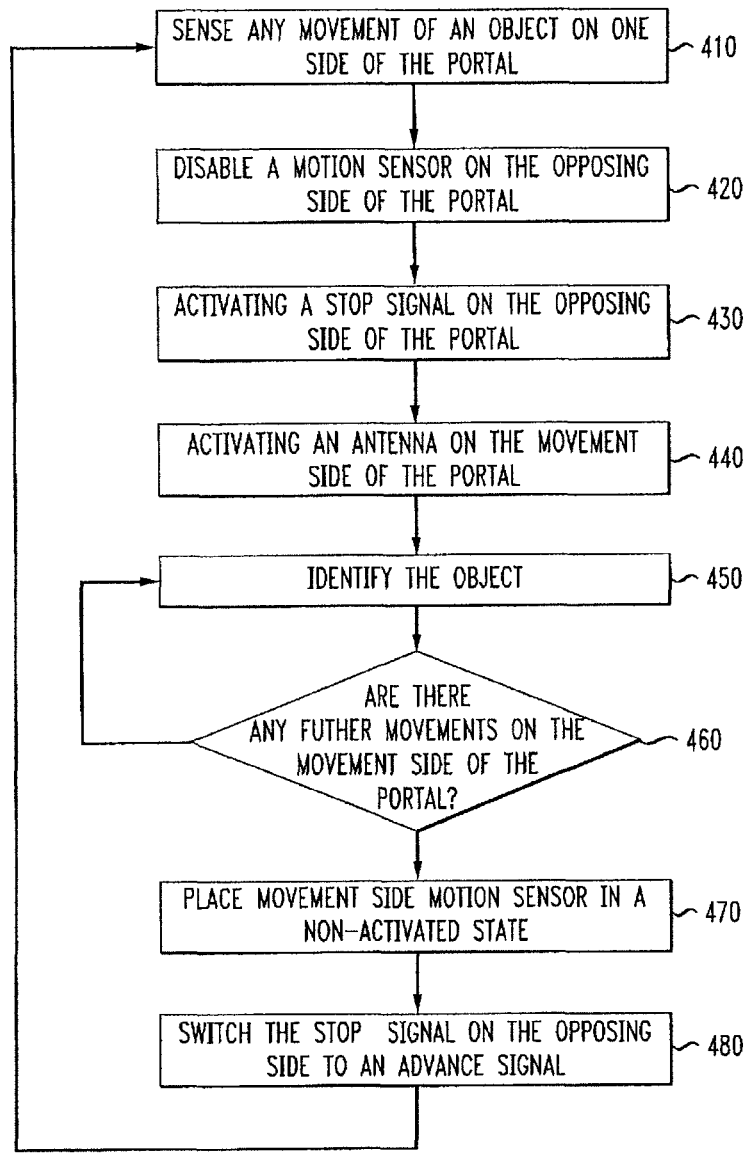
FIG. 4 shows an exemplary method for controlling the traffic flow through an RFID directional portal according to the exemplary embodiments of the present invention.

FIG. 4 shows an exemplary method 400 for controlling the traffic flow through the RFID directional portal 110 according to the exemplary embodiments of the present invention. The exemplary method 400 will be described with reference to the exemplary system 100 of FIG. 1. As described above, the exemplary method 400 may be used for determining the directionality of the object 170 moving through the RFID portal 110, as well as for instructing a user whether or not traffic is permitted through the portal 110. The object 170 may include an RFID tag 171 detectable by on the RFID readers 131, 132 of the RFID portal 110.

In step 410, one of the motion sensors 141, 142 may sense a movement of the object 170 as the object 170 approaches the RFID portal 110. For example, the object 170 may be approaching the left side of the RFID portal 110. Accordingly, the left motion sensor 141 may be activated based on the detection of the movement of the object 170. It should be noted that the RFID portal 110 may be positioned at an entrance to a building. As such, the left side of the portal 110 may relate to an area outside the building while the right side of the portal may relate to an area inside the building. Regardless of the positioning of the portal 110, the activation of a specific motion sensor may determine the direction of the approaching object 170. Since the left motion sensor 141 was activated, it may be determined that the object 170 is approaching the RFID portal 110 from the left side (e.g., entering the building from outside the portal 110).

In step 420, the left motion sensor 141 (e.g., on the "movement side") may deactivate the right motion sensor 142 (on the side opposing the "movement side"). Specifically, the functionality of each of the motion sensors 141, 142 may be driven by the other motion sensor and the external relay power fail operator 310. As described above, each of the motion sensors 141, 142 may be wired in such manner that the first motion sensor that is activated will disable an opposing motion sensor. Accordingly the exemplary method 400, the activation of the left motion sensor 141 may place the right motion sensor 142 in a "power loss" state, thereby preventing the operation of the right motion sensor 142. As such, any further objects approaching the RFID portal 110 from the right side may not interrupt or otherwise effect the processing of object traffic from the left side.

In step 430, the left motion sensor 141 may activate a stop signal on the right light stack 152. Similar to each of the motion sensors 141, 142, the functionality of each of the light stacks 151, 152 may be driven by the other motion sensor and the external relay power fail operator 310. Since each of the light stacks 151, 152 may include both and advance signal and a stop signal, the users of the RFID portal 110 may be provided with visual cues for traffic flow. The detection of movement from the left motion sensor 141 may trigger a stop signal on the right side light stack 152 until there is a break in the traffic from the left side. Once no further traffic is detected by the left motion sensor 141.

In step 440, the left motion sensor 141 may activate an antenna within the left RFID reader 131. As described above, the RFID portal 110 may include a plurality of RFID readers. For example, one or more RFID readers may be positioned on each side of the RFID portal 110 (e.g., inside and outside the portal 110, to left and the right of the portal 110, etc.). Therefore, the RFID reader(s) may correspond to one of the motion sensors 141, 142. By activating the left RFID reader 131 when movement is detected at the left motion sensor 141 while keeping the right RFID reader 132 inactivate, any data signals from RFID tags on the rights side of the portal 110 may not be read by the right RFID reader 132. Thus, the left RFID reader 131 may accurately process all the traffic on the left side of the portal 110 without any reads from the right side disrupting the process.

In step 450, the left RFID reader 131 may identify the RFID tag 170 of the object 170. Specifically, the antenna of the left RFID reader 131 may transmit a first signal (e.g., modulated RF energy) to the RFID tag 171 of the object 170. This modulated RF energy may induce in the RFID tag 171 with enough power for the tag 171 to power up and transmit a response signal. Then the antenna of the left RFID reader 131 may collect and decipher the data within the return signal in order to identify the RFID tag 171.

In step 460, the left motion sensor 141 may determine whether there is any further traffic on the left side of the RFID portal 110. As described above, the left motion sensor 141 may include an adjustable timer 211 for determining a duration for activating the any of the motion sensors 141, 142. Accordingly, once the object 170 has been identified, the left motion sensor 141 may remain active in order to sense any further objects. If a further object is detected, then the method may return to step 450 in order to read a further data signal from a further RFID tag. However, if no further objects are detected once the timer expires, then the method 400 may advance to step 470.

In step 470, the left motion sensor 141 may be placed in a non-activated state. Accordingly, the antenna of the left RFID reader 131 may be deactivated. Furthermore, the right side motion sensor 142 may switch from a "power loss" state to a non-activated state. Thus, both the left and right motion sensors 141, 142 may return to monitoring the area around the RFID portal 110.

In step 480, the right light stack 152 may switch from displaying the stop signal to displaying the advance signal. Therefore, both the left and right light stacks 151, 152 may display the advance signal, instructing the user that traffic is permitted from either side of the RFID portal 110. As such, the exemplary system 400 may now return to step 410 in order to sense any subsequent movements by additional objects.

The exemplary methods and systems described herein may allow for determining a direction of movement by the object 170 while detecting and identifying the RFID tag 171 on the object 170. In operation, the motion sensors 141, 142 may manage the activation of the RFID antennas, as well as visual cues from the light stacks 151, 152, in order to control the flow of traffic through the RFID portal 110. Accordingly, any reduction in the signal power of the RFID antennas may be avoided, thereby improving the overall percentage of successful reads (e.g., read rates) as the RFID tags travel through the RFID portal 110.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A system, comprising:
   a first motion sensor for sensing a movement of a first object on a first side of a portal, the portal comprising the first side and a second side, the first object including a first radio frequency identification tag; and
   a first radio frequency identification reader for being activated by the first motion sensor when the first motion sensor senses the movement of the first object on the first side of the portal, wherein the first radio frequency identification reader is for reading the first radio frequency identification tag, wherein the first motion sensor deactivates a second motion sensor for a predetermined period of time when the first motion sensor senses the movement of the first object on the first side of the portal, wherein the second motion sensor is for sensing a movement of a second object on the second side of the portal, wherein the second object comprises a second radio frequency identification tag.

2. The system of claim 1, wherein the second motion sensor is for activating a second radio frequency identification reader when the second motion sensor senses the movement of the second object on the second side of the portal, wherein the second radio frequency identification reader is for reading the second radio frequency identification tag.

3. The system of claim 1, further comprising:
   a relay for receiving a signal from the first motion sensor and for deactivating the second motion sensor.

4. The system of claim 1, further comprising:
   a signaling device for directing a flow of traffic through the portal.

5. The system of claim 4, wherein the signaling device is for indicating a traffic flow from the first side to the second side when the first motion sensor senses the movement of the first object on the first side of the portal.

6. The system of claim 4, wherein the signaling device includes a plurality of lights to direct the flow of traffic through the portal.

7. The system of claim 4, wherein the signaling device includes an audio cue to direct the flow of traffic through the portal.

8. The system of claim 1, wherein the predetermined period of time is adjustable.

9. The system of claim 1, wherein the first motion sensor comprises an acoustic motion sensor.

10. The system of claim 4, wherein the signaling device includes a first signaling device at the first side of the portal and a second signaling device at the second side of the portal, each of the first signaling device and the second signaling device including a stop signal and a go signal, wherein when the second motion sensor is deactivated, the stop signal of the second signaling device is activated.

11. A method, comprising:
   sensing, by a first motion sensor, a movement of a first object on a first side of a portal, the portal comprising the first side and a second side, the first object including a first radio frequency identification tag; and
   activating, via the first motion sensor, a first radio frequency identification reader when the first motion sensor senses the movement of the first object on the first side of the portal, wherein the first radio frequency identification reader is for reading the first radio frequency identification tag, wherein the first motion sensor deactivates a second motion sensor for a first predetermined period of time when the first motion sensor senses the movement of the first object on the first side of the portal, wherein the second motion sensor is for sensing a movement of a second object on the second side of the portal, wherein the second object comprises a second radio frequency identification tag.

12. The method of claim 11, wherein the second motion sensor is for activating a second radio frequency identification reader when the second motion sensor senses the movement of the second object on the second side of the portal, wherein the second radio frequency identification reader is for reading the second radio frequency identification tag.

13. The method of claim 11, further comprising:
reading, by the first radio frequency identification reader, the first radio frequency identification tag.

14. The method of claim 11, further comprising:
reactivating, after the first predetermined period of time has elapsed following the deactivating of the second motion sensor, the second motion sensor.

15. The method of claim 11, further comprising:
activating, upon the deactivating of the second motion sensor, a stop signal on the second side of the portal.

16. The method of claim 11, wherein the first motion sensor comprises an acoustic motion sensor.

17. The method of claim 14, further comprising:
sensing, by the second motion sensor, a movement of a second object on the second side of the portal, the second object including a second radio frequency identification tag;
activating, upon the sensing of the movement of the second object on the second side of the portal, a second radio frequency identification reader; and
deactivating, upon the sensing of the movement of the second object on the second side of the portal, the first motion sensor.

18. The method of claim 17, further comprising:
reading, by the second radio frequency identification reader, the second radio frequency identification tag; and
reactivating, after a second predetermined period of time has elapsed following the deactivating of the first motion sensor, the first motion sensor.

19. The method of claim 17, further comprising:
activating, upon deactivating the first motion sensor, a first stop signal on the first side of the portal.

20. The method of claim 11, wherein the first predetermined period of time is adjustable.

* * * * *